Nov. 29, 1927.
J. MERLE
1,651,288
CENTRIFUGAL CASTING APPARATUS
Filed March 27, 1923   2 Sheets-Sheet 1
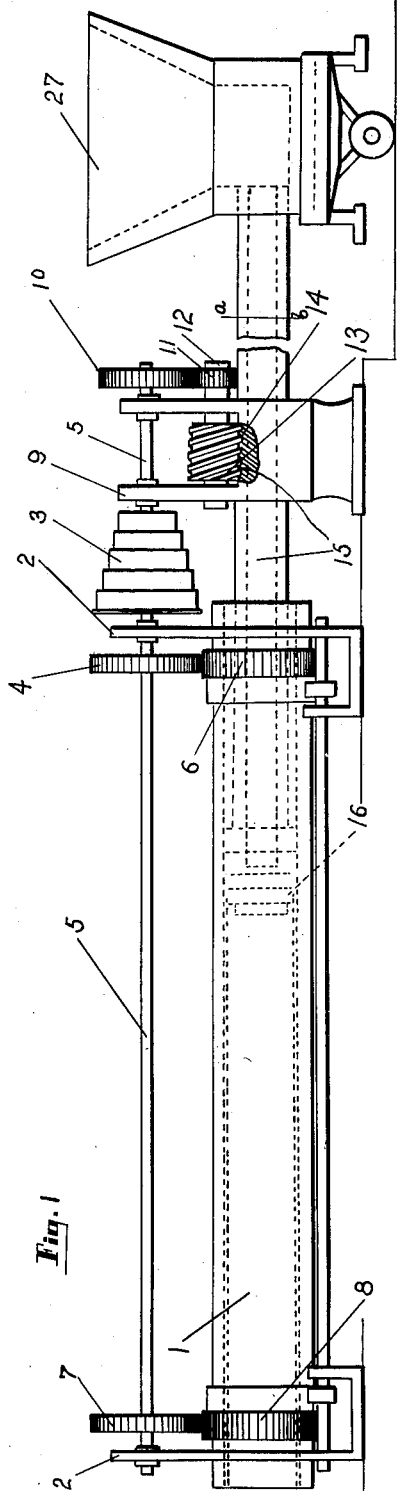
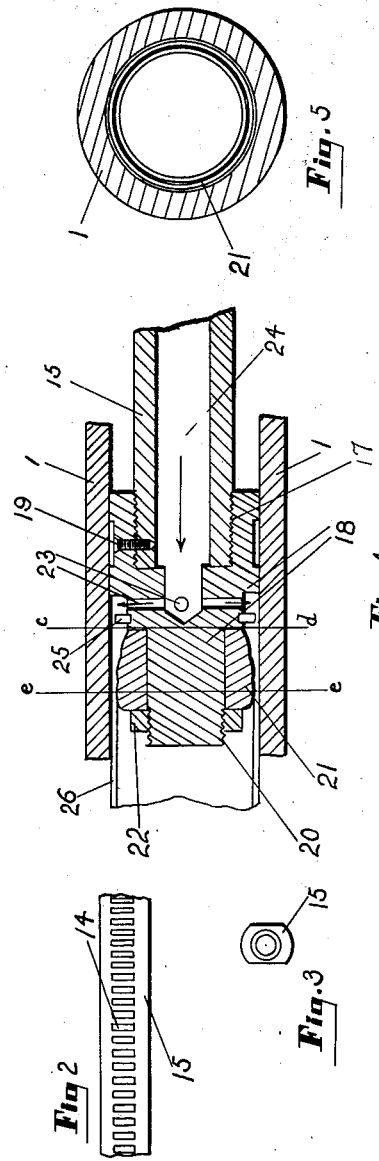
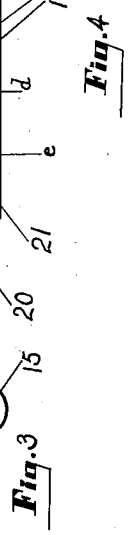
Inventor
José Merle
By Emil Bönnelycke
Attorney Nov. 29, 1927.
J. MERLE
1,651,288
CENTRIFUGAL CASTING APPARATUS
Filed March 27, 1923   2 Sheets-Sheet 2
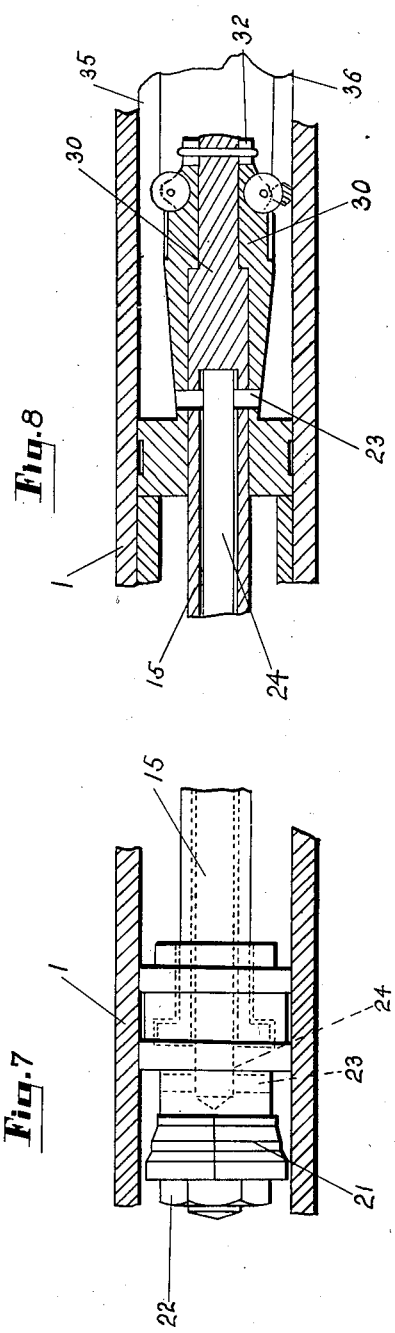
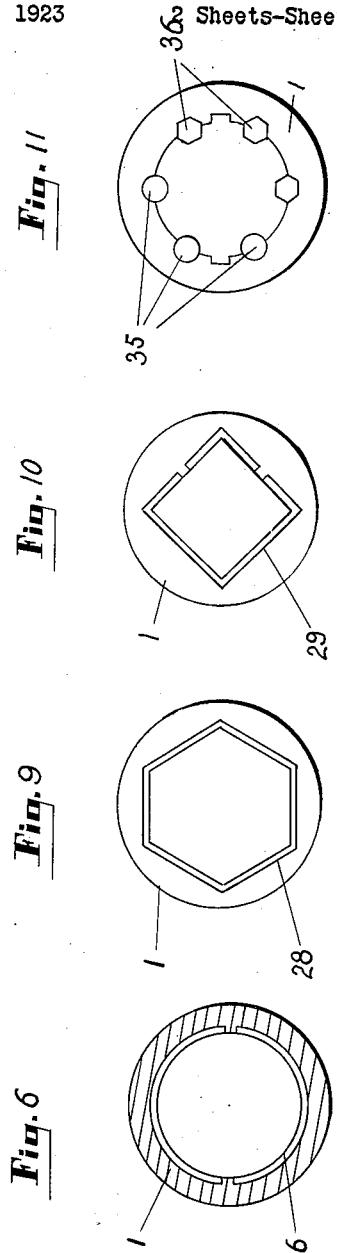
Inventor
José Merle
By Emil Bönnelycke
Attorney Patented Nov. 29, 1927.

1,651,288

UNITED STATES PATENT OFFICE.

JOSÉ MERLE, OF BUENOS AIRES, ARGENTINA.

CENTRIFUGAL CASTING APPARATUS.

Application filed March 27, 1923. Serial No. 628,074.

My present invention relates to an improved process and to an automatic machine for mixing, compressing, moulding, solidifying, forging, rolling, laminating, drawing, turning, milling, screw-cutting, etc., a liquid or plastic raw material, its main object being to provide a new method for automatically carrying into practice all or some of the above operations in order to produce all kinds of metallurgical and other products, such as tubes, sheets, rods, bars, wires, etc. which may have any form and cross-section as well as a limited predetermined length.

With these and many other objects in view my present invention consists in the features as hereinafter explained and which are clearly set forth in the appended claiming clauses.

The method according to my present invention mainly consists in introducing the liquid or plastic raw material to be worked within a mould which is subjected to a rotary movement on its axis and through which a fixed or rotary chuck is capable of a longitudinal sliding movement, said chuck acting progressively by its sliding movement on small masses of the said liquid or plastic material which thus undergoes all or some of the aforesaid operations.

The machine for carrying into practice the above method includes the following main parts:—

(a) A rotary mould mounted on rollers and provided with geared wheels or the like which allow it to revolve at variable and regulable speeds, said movement being produced by any suitable transmission on a cone of pulleys or by direct coupling with an electric motor running at variable and regulable speeds. Said rotary mould is open at both ends and may consist of a single or a number of demountable parts and may also be provided with means for opening it wholly or partly so as to allow the products being manufactured therein to have a different inner and outer periphery.

(b) A central fixed feeding apparatus which is capable of a longitudinal sliding movement within the mould from one end to the other thereof, said apparatus being operated by means of a mechanism which turns at a speed which is related to the revolving speed of the mould or independent thereof. Said feeding apparatus is fixed with reference to the rotary motion of the mold and carries at one end a series of tools, which may be fixed or rotatable, said tools being designed for carrying out the operations as above described.

When the machine is used for the manufacture or working of hollow bodies of circular cross-section, said tools are preferably fixed, but when said bodies are to be of a noncircular cross-section, the whole of the said tools are disposed in such a way as to turn together with the mould, the cross section of the said tools corresponding or not with that of the mould.

In order that my present invention may be clearly understood and easily carried into practice some preferred embodiments of the same have been shown in the appended drawings wherein—

Figure 1 is a side view of one of the embodiments of the machine for carrying out the method according to my present invention.

Figure 2 shows a detail of the feeding tube with the rack thereon.

Figure 3 is a section of the feeding tube on the line a—b of Fig. 1.

Figure 4 is a longitudinal cross section of the mould together with the feeding tube and the tools carried thereby which form a chuck.

Figure 5 is a transverse section on the line c—d of Figure 4.

Figure 6 is a transverse section on the line e—e of Figure 4.

Figure 7 is a section equivalent to that of Figure 4 in which the whole of the tools constituting the chuck are mounted to turn freely at the end of the feeding tube.

Figure 8 shows another similar view of another embodiment of the invention for the manufacture of solid products such as plates, bars and wires.

Figures 9 and 10 are transverse sections of the mould and chuck which show their disposition for the manufactures of products of different cross-sections.

Figure 11 is a cross-sectional view of a mould for producing bars.

Similar characters of reference denote same or like parts throughout the said figures.

It must be clearly understood that the present invention is not limited to the precise embodiments shown and described, which are only given by way of example, as the inner section of the mould as well as the section and nature of the tools used at the end of the feeding tube may be considerably altered according to the nature of the work to be produced.

In the embodiment shown in the drawings, 1 is the mould which may be of any suitable material and of a suitable section according to the nature of the work desired. Said mould may be constructed in one or more pieces and may also be provided with suitable doors or openings or demountable parts, so that different inner and outer peripheries may be given to the manufactured products. Said mould is rotatably supported in any suitable way well known in the art. 2 and 9 are suitable supports on which the axle 5 is rotatably mounted, said axle carrying a cone of pulleys 3 to which the movement is transferred through suitable transmission means from any convenient source of power. The geared wheels 4 and 7 are mounted on the same axle 5, said wheels meshing with the geared wheels 6 and 8 which are fixed to the outer periphery of the mould, so that the rotary movement of the axle 5 is transmitted by the said geared wheels to the mould 1. The above described means of transmission is only given by way of example, as it will be clearly understood that any other known means may be used for producing the rotary movement of the mould 1. A geared wheel 10 is also carried by the axle 5, said wheel meshing with the geared wheel 11 which is mounted on the end of the axle 12 turning in bearings on the support 9. The axle 12 carries a worm gear 13 which meshes with a worm-rack 14 suitably fixed or formed in one piece on the top of the feeding tube 15, said tube carrying at one end the tools 16. The free end of the tube 15 carries a feeding receptacle 27 in which the liquid or plastic material to be worked in the machine is poured.

As will be seen from Figure 4, the end of the central feeding tube 15, which is not capable of rotary movement and which by means of the rack 14 receives a longitudinal motion within the mould 1, is externally screwthreaded at 17 so as to receive the tool-holder device 18 which is set in position by means of a set screw 19 which prevents rotation with respect to the mould. The end of the tool-holder 18 is also externally screwthreaded at 20, the tool 21 being placed on the screwthreaded end and held in position by means of the nut 22. The central bore 24 of the feeding tube 15 ends in a number of substantially radial branches 23 which discharge the contents against the inner walls of the mould within the free space left by the tool 21, and adjacent said tool there are provided the mixing blades 25 in the tool holder. 26 is a tube as formed in the mould.

In the case of the embodiment described, the operation is as follows, and for the clearness of the description it shall be assumed that the piece to be manufactured is a metallic tube.

The raw material which is poured into the charging receptacle 27 is a molten metal such as steel, copper, lead, iron, etc. in the most pure condition to be obtained from the industrial furnaces. The said liquid raw material, being of a determined chemical composition according to the nature of the work required and in a very homogeneous state is continuously introduced within the mould 1 through the bore 24 of the feeding tube 15, which has been advanced to the end of the mould 1, while at the same time the mould 1 is turned at a suitable speed and the feeding tube together with the tools fixed thereon receive a longitudinal motion at a suitable speed. It will be seen from the foregoing that the machine acts only on a small mass of the material introduced, said mass being in perfect relationship with the cross section of the final product and being subjected to the following mechanical and physical actions.

(a) An energetic and regulable centrifugal compression of the product in this liquid and semi-solid state which fully eliminates and expels therefrom all the gases contained towards the end of the charging receptacle.

(b) Before the complete cooling and by means of the mixing blades 25 a division, beating and mixing of the liquid material is obtained before the solidification thereof, the speed and temperature of the solidification, being regulable immediately after such mixing. The regulation of the speed and the temperature of solidification is effected by regulating the speed of the machine in any suitable manner.

(c) The working by means of the tools constituting the chuck of the cooled and solidified product with continuous compression by the centrifugal force which increases gradually due to the diminishing section of the material.

Said operations are realized by the retracting movement of the tube 15 within the mould together with the tools 16, which being fixed with relation to the said mould effects a drawing, rolling, laminating and forging of the inner wall of the tube, which emerges thus out of the machine in a perfect state and finish.

When it is desired to manufacture hollow bodies of sections other than the circular form, such as square or hexagonal, for instance, moulds 1 of a corresponding shape are used and in this case, as shown in Figures 7, 9 and 10, the tool or tools 21 have a similar configuration when the inner periphery of the piece is to correspond to the outer periphery, said tools being so mounted on the tube 15 so as be capable of rotary movement if desired. The work is in this case effected by drawing out and the compression is obtained by the centrifugal force as well as by the diminishing free space between the inner surface of the mould and the outer surface of the chuck.

For the manufacture of bars of any cross section, for instance, round (35) or hexagonal bars (36) and profiles such as T-bars, angles, rails and the like a mould is used having a series of longitudinal channels of suitable shape and a tool or series of tools adapted to turn together with the said mould, the tools being mounted on an end of the feeding tube and held in position by the washer 32 so that the said tools may turn freely on the end of the said tube as an axle.

Plates may be also obtained by forming tubes open along a generatrix and subjecting them to a further lamination in the ordinary way. Profiles of any section may be also obtained by simply varying the section and shape of the tools.

My present invention as stated before is in no way limited to the specific form of apparatus described or to the operations specified, but includes any others within the scope of the invention which has been clearly and precisely set forth in the appended claiming clauses. It is obvious that these different operations and results will be obtained by different inner shapes of the mould and corresponding or different shapes of the tool or tools which may or may not be carried by the mould in its rotary movement.

Having now fully described and ascertained the nature of my said invention and in what manner the same is to be carried into practice, I declare that what I claim and desire to protect by Letters Patent is:—

1. A casting machine comprising a supporting frame; a mould rotatably mounted in said frame; a feeding tube slidably supported in said frame, one end being adapted to move longitudinally in said mould; a charging receptacle secured at the other end of said feeding tube and adapted to move with said tube; means mounted on said supporting frame for rotating said mould and moving said feeding tube longitudinally into and out of said mould; and a plurality of tools on the end of said feeding tube for finishing the casting to its desired dimensions and configuration.

2. A casting machine comprising a supporting frame; a mould rotatably mounted in said frame; a feeding tube slidably supported in said frame, one end being adapted to move longitudinally in said mould; means mounted on said supporting frame for rotating said mould and moving said feeding tube in said mould; and means on the end of said feeding tube for finishing the casting to its desired dimensions and configuration.

3. A casting machine comprising a supporting frame; a mould rotatably mounted in said frame; a feeding tube slidably supported in said frame, one end being adapted to move longitudinally in said mould; a charging receptacle secured at the other end of said feeding tube and adapted to move with said tube; driving means mounted on said supporting frame for rotating said mould and moving said feeding tube longitudinally into and out of said mould; and a plurality of tools on the end of said feeding tube for mixing the casting metal and for finishing the casting to its desired dimensions and configuration.

4. A casting machine comprising a mould adapted to be rotated; a feeding tube associated with said mould and adapted to move in said mould; means for rotating said mould and operating said tube; and a plurality of tools on the end of said tube for finishing the casting to its desired dimensions and configuration.

5. A casting machine comprising a supporting frame; a mould rotatably mounted in said frame; a feeding tube supported in said frame and adapted to project longitudinally into said mould; means for rotating said mould and for moving said tube into and out of said mould; and a plurality of tools on the end of said tube for finishing the casting to its desired dimensions and configuration.

6. A casting machine comprising a mould adapted to be rotated; a feeding tube associated with said mould and adapted to move longitudinally in said mould; and a plurality of tools on the end of said tube for finishing the casting to its desired dimensions and configuration.

7. A casting machine comprising a rotatable mould; a feeding tube associated with said mould and adapted to move longitudinally in said mould while feeding the molten metal; and a plurality of tools secured to said tube for finishing the surface of the casting to its desired dimensions and configuration.

8. A centrifugal casting machine comprising a mold mounted to turn on a horizontal axis, means for rotating said mold at variable and regulable speed depending upon the characteristics of the casting to be produced and the properties to be imparted thereto, means for feeding liquid metals into the mold, a tool carrying mandrel device capable of longitudinally sliding inside the mold, and means for actuating said mandrel at variable and regulable speed and to feed the tools.

9. A centrifugal casting machine for metals or alloys comprising a mold, means for rotating said mold at variable and regulable speed depending upon the characteristics of the casting to be produced and the properties to be imparted therein, means for simultaneously feeding the liquid metals into the mold, a tool-carrying mandrel device capable of longitudinally sliding inside the mold, and means for actuating said mandrel at variable and regulable speed and to feed the tools.

10. A centrifugal casting machine for metals or alloys comprising a mold mounted to turn on a horizontal axis, means for rotating said mold at variable and regulable speed depending upon the characteristics of the casting to be produced and the properties to be imparted therein, a tool-carrying mandrel device capable of longitudinally sliding inside the mold, and means for actuating said mandrel at variable and regulable speed.

11. A centrifugal casting machine comprising a feeding tube centrally disposed in the said mold and capable of longitudinally sliding within the mold, means for actuating said feeding device at variable and regulable speed, a charging mouth at one end of said feeding device, and a discharging mouth at the other end to which is disposed a tool carrying mandrel adapted to receive a plurality of tools for working the casting to the finished product.

In testimony whereof I affix my signature.

JOSÉ MERLE.